US012203731B1

(12) United States Patent
Gibson

(10) Patent No.: US 12,203,731 B1
(45) Date of Patent: Jan. 21, 2025

(54) UNMANNED HUMAN ANALOGUE

(71) Applicant: Grant Gibson, Englewood, CO (US)

(72) Inventor: Grant Gibson, Englewood, CO (US)

( * ) Notice: Subject to any disclaimer, the term of this patent is extended or adjusted under 35 U.S.C. 154(b) by 0 days.

(21) Appl. No.: 18/675,535

(22) Filed: May 28, 2024

(51) Int. Cl.
*H05B 3/06* (2006.01)
*F41H 11/00* (2006.01)
*F41J 2/02* (2006.01)

(52) U.S. Cl.
CPC ................ *F41J 2/02* (2013.01); *F41H 11/00* (2013.01); *H05B 3/06* (2013.01)

(58) Field of Classification Search
CPC ................ H05B 3/06; F41J 2/02; F41H 11/00
USPC ........................................................ 250/495.1
See application file for complete search history.

(56) References Cited

U.S. PATENT DOCUMENTS 5,783,831 A * 7/1998 Tusch .................... H04B 10/11 250/504 R
7,820,969 B2 * 10/2010 Guinn ........................ F41J 2/02 250/504 R
2012/0305770 A1 * 12/2012 Minera .................. A41D 1/002 250/206

* cited by examiner

*Primary Examiner* — Kiet T Nguyen
(74) *Attorney, Agent, or Firm* — Hall Estill Law Firm

(57) ABSTRACT

An unmanned human analogue that includes a silhouette frame shaped like a human form and a heat source. The unmanned human analogue also includes a flexible shell supported by the silhouette frame to disperse heat from the heat source across the unmanned human analogue. A method of simulating an infrared signature of a human. The method includes the steps of positioning an unmanned human analogue at a desired location and causing the unmanned human analogue to have an infrared heat signature.

20 Claims, 4 Drawing Sheets

UNMANNED HUMAN ANALOGUE

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to an unmanned human analogue that can simulate heat signatures of actual humans.

2. Description of the Related Art

During armed conflicts, intelligence relating to the opposition is extremely valuable and important. The number of troops and troop movements of the opposition is extremely valuable intelligence during armed conflicts. One method armies use to try and determine the number of troops and troop movements of the opposition is to use infrared, which senses a troop members body heat, to track troops and troop movements. In addition to gathering intelligence on the opposition during armed conflicts, armies also try and manipulate information about themselves to cause the opposition's intelligence to be defective.

Accordingly, there is a need for a way to cause an opposition's intelligence to be defective in an armed conflict. One way to accomplish this is with the use of an unmanned human analogue that gives off a heat signature similar to that of a human being.

SUMMARY OF THE DISCLOSURE

The present disclosure is directed to an unmanned human analogue. The unmanned human analogue includes a silhouette frame shaped like a human form and a heat source. The unmanned human analogue also includes a flexible shell supported by the silhouette frame to disperse heat from the heat source across the unmanned human analogue. The present disclosure is also directed to a method of simulating an infrared signature of a human. The method includes the steps of positioning an unmanned human analogue at a desired location and causing the unmanned human analogue to have an infrared heat signature.

DETAILED DESCRIPTION OF THE DISCLOSURE

Figure 1:
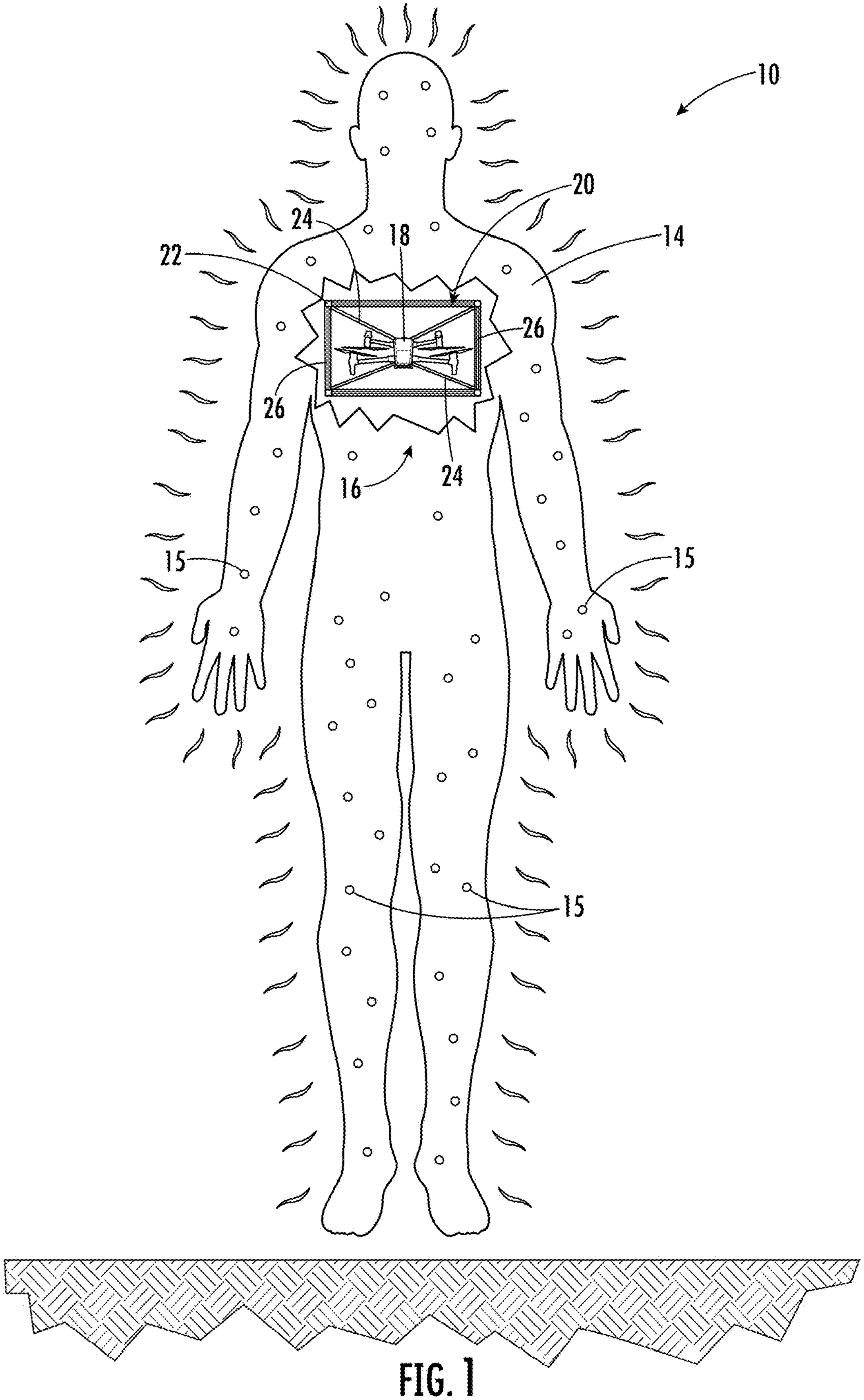
FIG. 1 is a front elevation view of an unmanned human analogue showing an exposed internal part constructed in accordance with the present disclosure.
Figure 2:
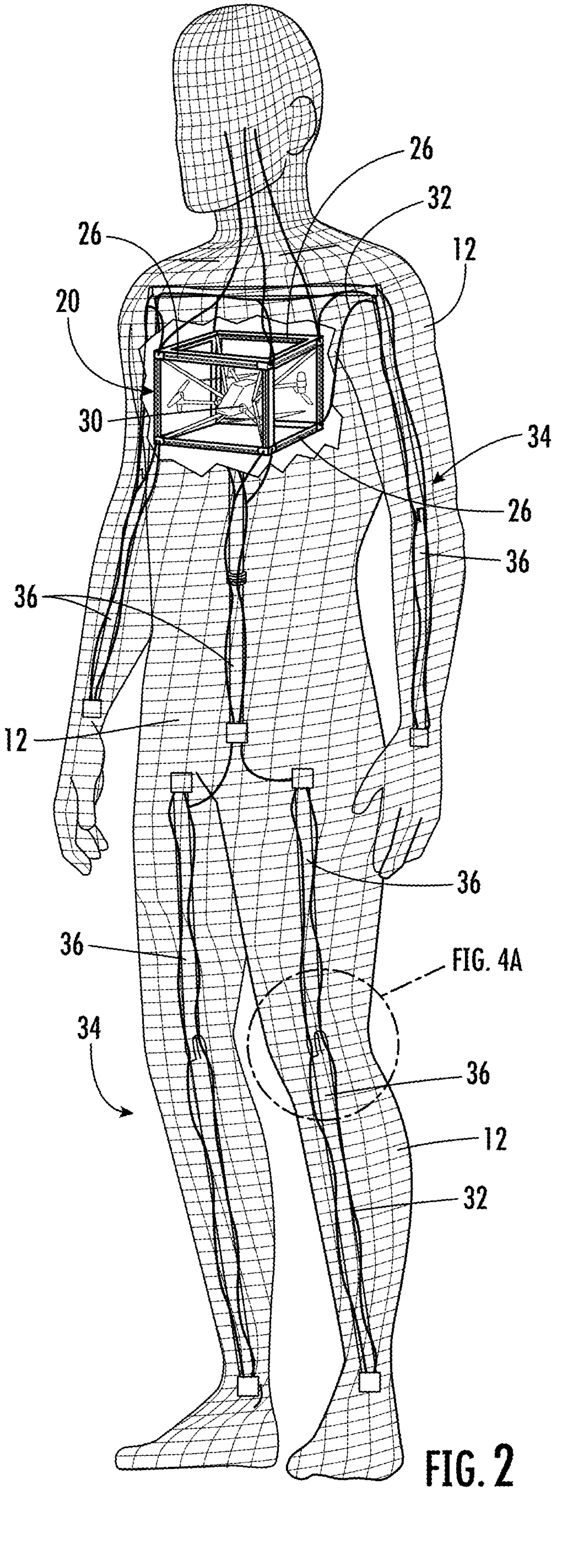
FIG. 2 is a perspective view of the unmanned human analogue with a shell portion removed and constructed in accordance with the present disclosure.
Figure 3:
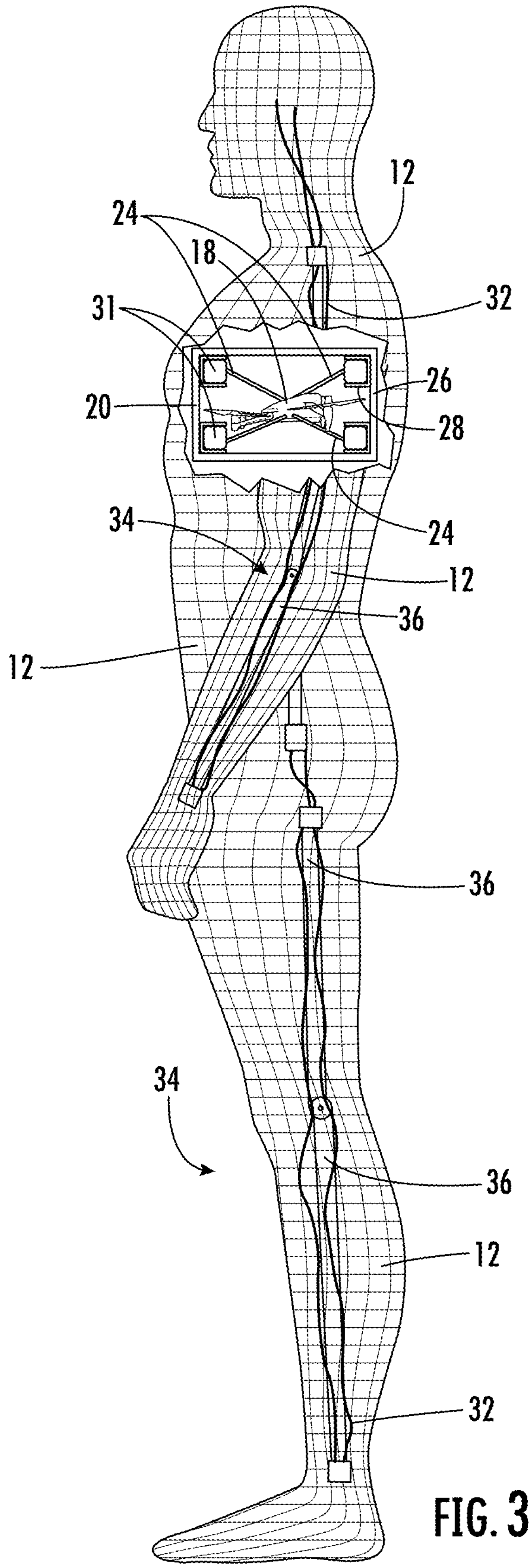
FIG. 3 is a side elevation view of the unmanned human analogue detailing a part of the unmanned human analogue constructed in accordance with the present disclosure.

Referring now to FIGS. 1-3, the present disclosure is directed to an unmanned human analogue 10 that gives off a heat signature and can be used to mimic the presence of troops in an armed conflict. The unmanned human analogue 10 can include a silhouette frame 12 that, when inflated, has a shape and size similar to that of an adult human and a flexible shell 14 that works with the silhouette frame 12 to distribute a heat signature across the unmanned human analogue 10. The flexible shell 14 can be secured to the silhouette frame 12 via any manner known in the art. For example, the flexible shell 14 can be secured to the silhouette frame 12 via adhesion, the flexible shell 14 could be tied to the silhouette frame 12, the flexible shell 14 could secured to the silhouette frame 12 via hooks, clips, hook and loop pieces, etc. The silhouette frame 12 could be sewn directly into the flexible shell 14, or portions of the silhouette frame 12 are sewed into the flexible shell 14. The silhouette frame 12 could be any material such that the unmanned human analogue 10 can withstand certain operational conditions. The silhouette frame 12 could be made of silk, a polymeric material, etc. such that the silhouette frame 12 is light and strong. The flexible shell 14 can include various sized openings 15 therein to permit air flow generated by the drone 18 to flow out of the unmanned human analogue 10 and help maintain its inflation.

The unmanned human analogue 10 can also include a drone cavity 16 for accepting a drone 18. The drone 18 has multiple functions with respect to the unmanned human analogue 10. The air flow generated from the drone 18 inflates the unmanned human analogue 10 and is used to move the unmanned human analogue 10 as desired. The unmanned human analogue 10 can be designed to work with multiple types of commercial drones 18. A drone housing 20 can be secured inside the drone cavity 16 such that the drone 18 can be secured therein. The drone housing 20 can be secured in the drone cavity 16 via any means known in the art. For example, the drone housing 20 could be tied to the silhouette frame 12, the drone housing 20 could secured to the silhouette frame 12 via hooks, clips, hook and loop pieces, etc. The drone housing 20 could be sewn directly into the silhouette frame 12, or portions of the drone housing 20 could be sewn into the silhouette frame 12.

The drone housing 20 could be constructed in any manner such that the drone 18 could be secured inside the unmanned human analogue 10 by the drone's attachment to the drone housing 20. The drone housing 20 could have anchor points 22 where connection rods 24 can be secured thereto on one end. The other ends of the connection rods 24 can be secured to various parts of the drone 18. The connection rods 24 can be rigid, semi rigid or flexible such that functionality of the drone 18 is not compromised. The connection rods 24 are connected to the drone in any place where functionality of the drone 18 is not compromised. The drone housing 20 could be a series of rod elements 26 combined to make a desired shape for the drone housing 20. For example, the drone housing 20 could be square shaped, rectangular shaped, spherical shaped, oblong shaped, etc. In one embodiment, the rod elements 26 could be combined to make a shape that is similar to the shape of a human chest cavity.

The connection rods 24 can be connected to the drone housing 20 at the anchor points 22 via any manner known in the art. The connection rods 24 can be secured to the drone housing 20 via magnets disposed on the connection rods 24 and/or the drone housing 20. The connection rods 24 can be secured to the drone housing 20 via hooks and loops, clasps, buckles, etc. The drone housing 20 could also include brackets 28 that engage with magnets 30 disposed on the ends of the connection rods 24. The other ends of the connection rods 24 can be releasably secured to the drone 18. The drone 18 could have attachment points 30 where the connection rods 24 are releasably secured thereto. The attachment points 30 could be any mechanism such that the connection rods 24 can be releasably secured thereto. For example, the attachment points 30 could be ring members that clasps, or carabiner type devices attached to the ends of the connection rods 24 could be secured to. The connection rods 24 could also be equipped with hook and loops, straps, etc. to engage with parts of the drone 18 to maintain position of the drone 18 with respect to the drone housing 20.

The unmanned human analogue 10 can also include heating wires 32 to provide the heat that is distributed across the silhouette frame 12 and the flexible material 14 to give the impression that the unmanned human analogue 10 is an actual human when viewed via an infrared device. The heating wires 32 can be attached to a power source, such as a battery, to provide the electricity that causes the heating wires to generate heat. The heating wires 32 can be secured to various parts of the silhouette frame 12 or they could be attached to various parts of a skeletal structure 34 that contributes to providing the unmanned human analogue 10 with body-like movements.

The skeletal structure 34 can include numerous structural segments 36 that represent various parts of the human body. For example, there could be a structural segment 36 for the upper part of the arms, the lower part of the arms, the upper part of the legs, the lower part of the legs, etc. There could also be structural segments associated with the hands, feet and head. The structural segments 36 can be made of any material and have any shape such that desired movement of the unmanned human analogue 10 could be achieved. The structural segments 36 could be made of a lightweight material, such as carbon fiber, polymeric materials, wood, etc. The structural segments 36 could be generally cylindrically shaped. The structural segments 36 could be supported by the silhouette frame 12

Figure 4A:
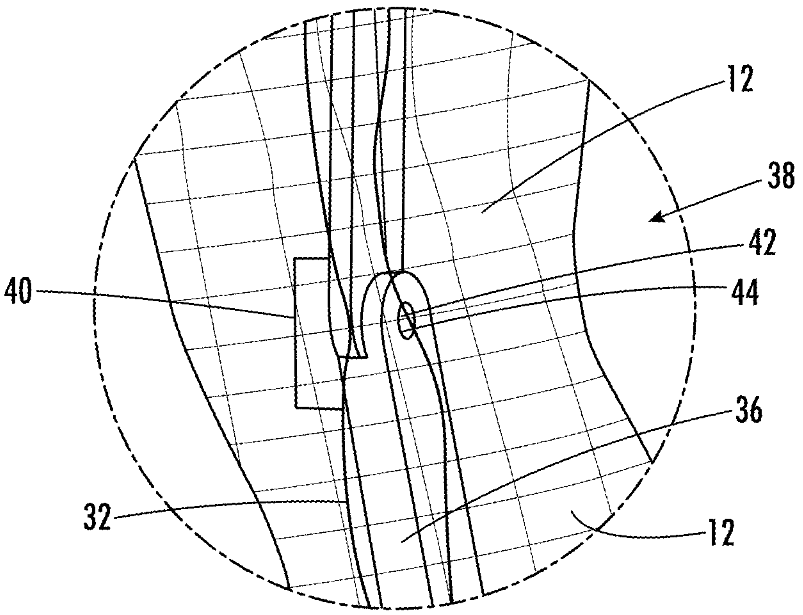
FIG. 4A is a perspective view of a part of the unmanned human analogue shown in a first position and constructed in accordance with the present disclosure.
Figure 4B:
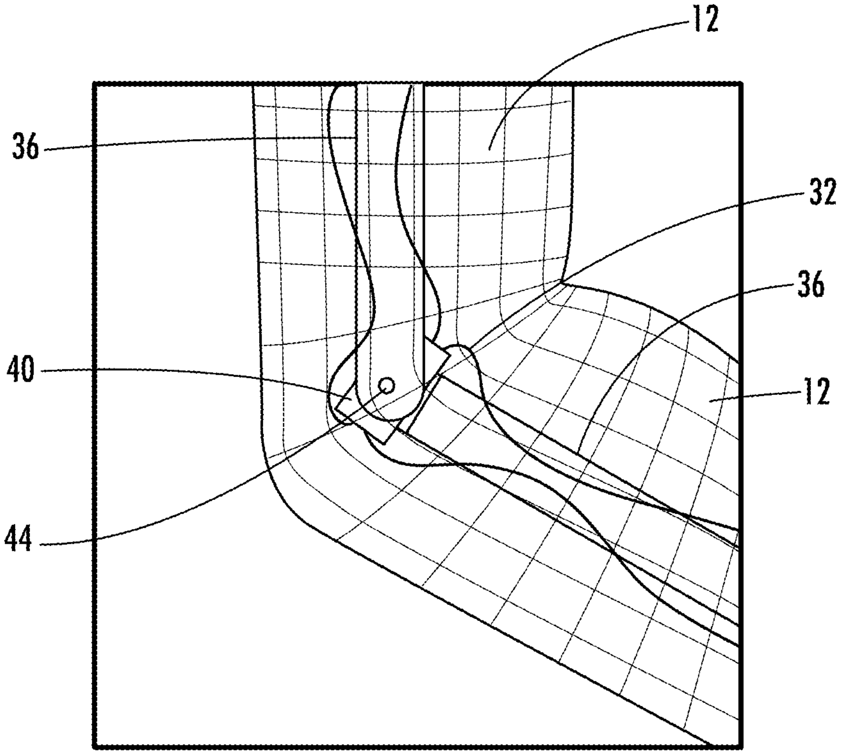
FIG. 4B is a perspective view of the part of the unmanned human analogue shown in FIG. 4A in a second position and constructed in accordance with the present disclosure.

Referring now to FIGS. 4A and 4B, the unmanned human analogue 10 could include motive sections 38 where structural segments 36 come together to form a joint. Examples of joints where motive sections 38 could be used include, but are not limited to, wrists, knees, hips, ankles, elbows, neck and shoulders. The motive sections 38 can be generated by hinged movement between structural segments 36. The hinged movement of the motive sections 38 can be generated by use of a motor 40 with a shaft 42 that can engage at least one of the structural segments 36 at a particular motive section 38. Each structural segment 36 can have an openings 44 disposed in the ends where the hinged movement occurs. Once of the openings 44 in one of the structural segments 36 can have threads (not shown) that interact with threads on the shaft 42 of the motor 40. This threaded engagement allows the motor 40 to move one of the structural segments 36 with respect to the other structural segment 36. The motors 40 could be set up to be in wireless communication with a remote control (not shown) that controls the drone 18 such that a desired motive section 38 can move as desired via movement commands from the remote control.

The present disclosure is also directed to a method of simulating the presence of troops via emulating an infrared signature with the unmanned human analogue 10. It should be understood and appreciated that the unmanned human analogue 10 can be used to present the infrared signature of a human for any purpose, not just military. The unmanned human analogue 10 can be moved from one position to another position to simulate the movement of an actual human. The whole unmanned human analogue 10 or parts of the unmanned human analogue 10 can be moved to simulate movement of a human.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An unmanned human analogue, the unmanned human analogue comprising:
- a silhouette frame shaped like a human form;
- a heat source; and
- a flexible shell supported by the silhouette frame to disperse heat from the heat source across the unmanned human analogue.

2. The unmanned human analogue of claim 1 wherein the silhouette frame is sewn into the flexible shell.

3. The unmanned human analogue of claim 1 further comprising a drone cavity therein for accepting a drone.

4. The unmanned human analogue of claim 3 further comprising a drone housing supported by the silhouette frame to accept the drone.

5. The unmanned human analogue of claim 4 further comprising connection rods attachable to the drone and the drone housing for securing the drone within the drone housing.

6. The unmanned human analogue of claim 5 wherein the drone housing includes brackets attached thereto that receive magnets attached to the connection rods.

7. The unmanned human analogue of claim 1 wherein the heat source is heating wires that run throughout the unmanned human analogue.

8. The unmanned human analogue of claim 1 further comprising a skeletal structure made up of sections of structural segments to provide rigidity to various parts of the unmanned human analogue.

9. The unmanned human analogue of claim 8 further comprising motors to rotate one structural segment relative to another structural segment to simulate human movement of the unmanned human analogue.

10. A method of simulating an infrared signature of a human, the method comprising:
- positioning an unmanned human analogue at a desired location; and
- causing the unmanned human analogue to have an infrared heat signature.

11. The method of claim 10 further comprising moving the unmanned human analogue from a first position to a second position.

12. The method of claim 11 further comprising moving a part of the unmanned human analogue.

13. The method of claim 10 wherein the unmanned human analogue comprises:
- a silhouette frame shaped like a human form;

a heat source; and a flexible shell supported by the silhouette frame to disperse heat from the heat source across the unmanned human analogue.

14. The method of claim 13 further comprising a drone cavity therein for accepting a drone.

15. The method of claim 14 further comprising a drone housing supported by the silhouette frame to accept the drone.

16. The method of claim 15 further comprising connection rods attachable to the drone and the drone housing for securing the drone within the drone housing.

17. The method of claim 16 wherein the drone housing includes brackets attached thereto that receive magnets attached to the connection rods.

18. The method of claim 13 wherein the heat source see heating wires that run throughout the unmanned human analogue.

19. The method of claim 13 further comprising a skeletal structure made up of sections of structural segments to provide rigidity to various parts of the unmanned human analogue.

20. The method of claim 19 further comprising motors to rotate one structural segment relative to another structural segment to simulate human movement of the unmanned human analogue.

* * * * *